Feb. 19, 1935. W. H. RUSSELL 1,991,466
COMBINATION AIRPLANE AND HELICOPTER
Filed Aug. 25, 1934 3 Sheets-Sheet 1
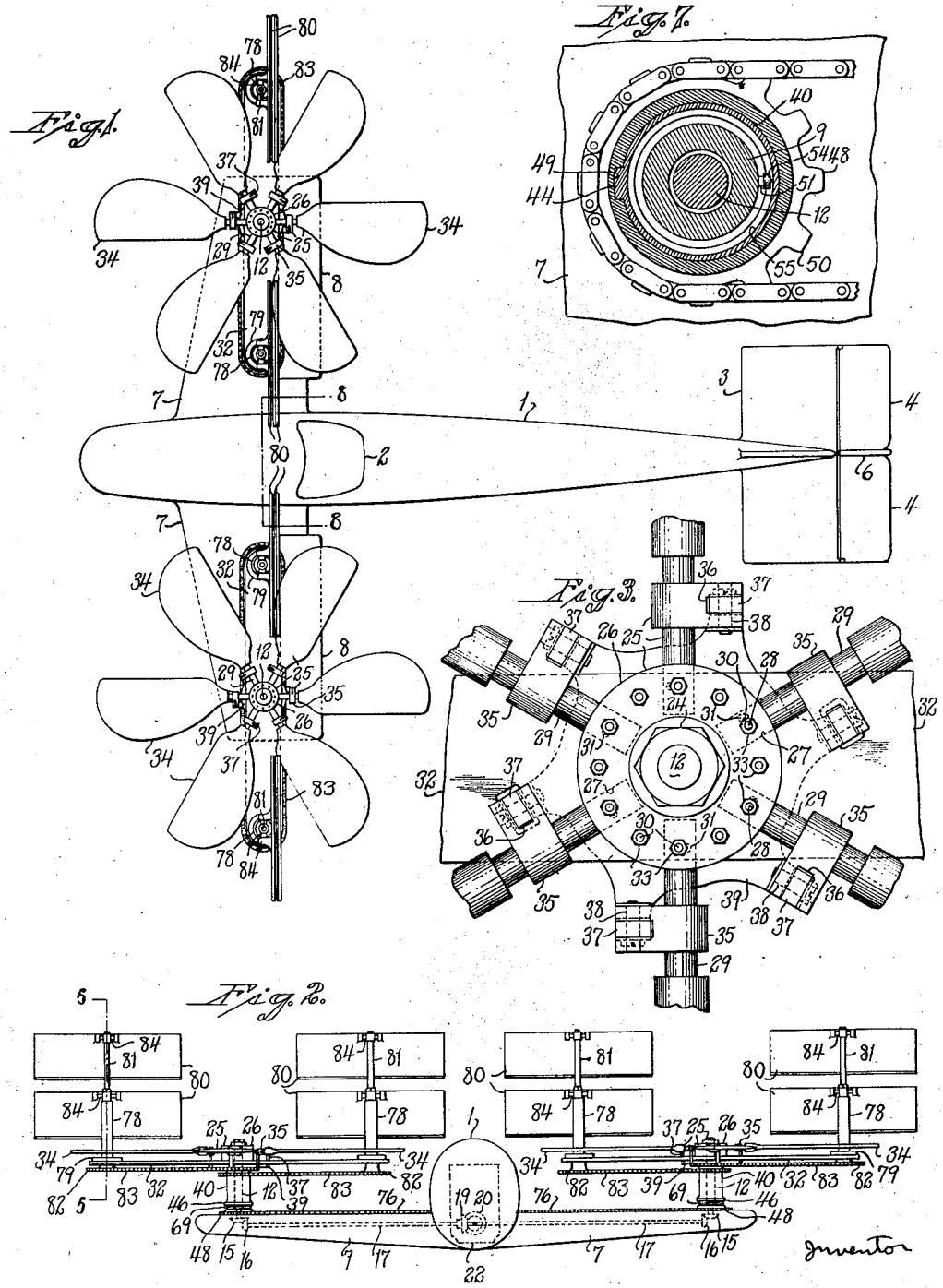
Inventor
William Huntington Russell Feb. 19, 1935. W. H. RUSSELL 1,991,466
COMBINATION AIRPLANE AND HELICOPTER
Filed Aug. 25, 1934 3 Sheets-Sheet 2
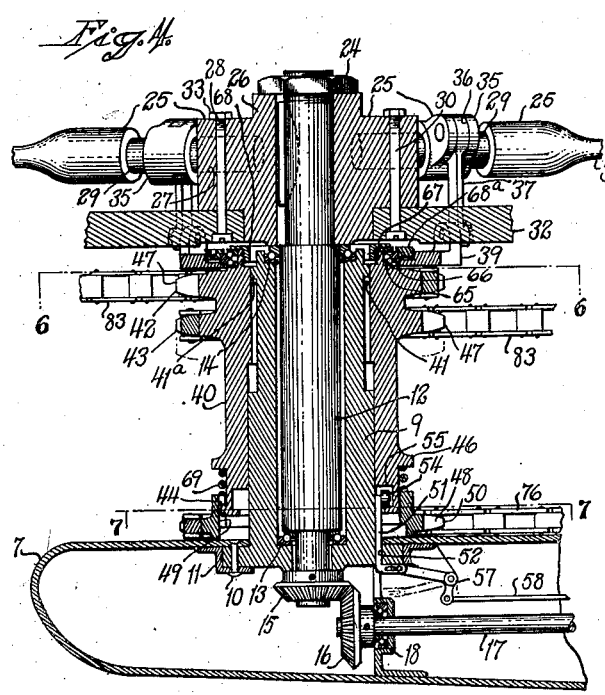
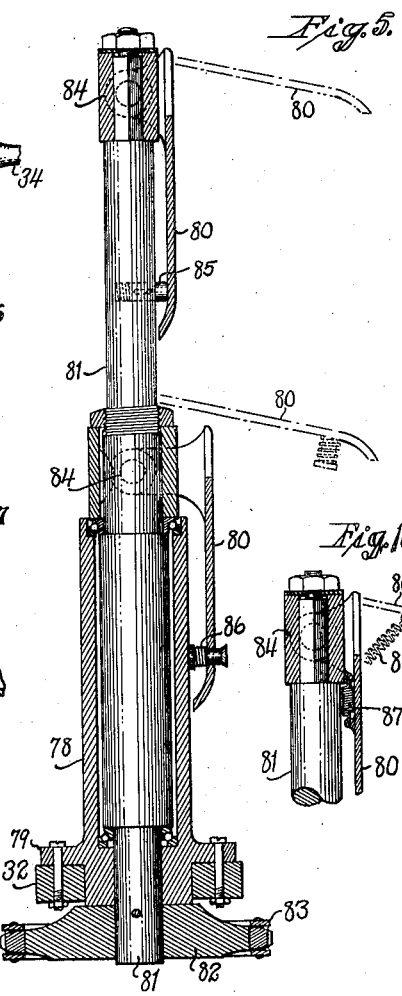
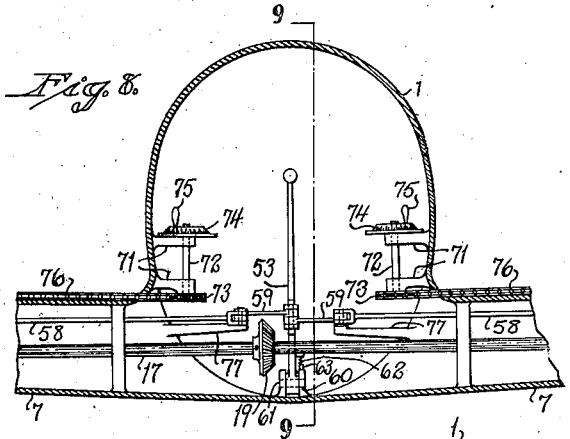
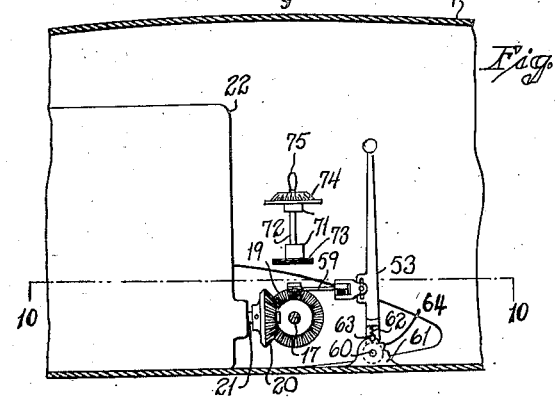
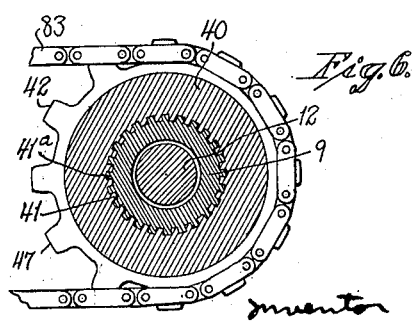
William Huntington Russell.

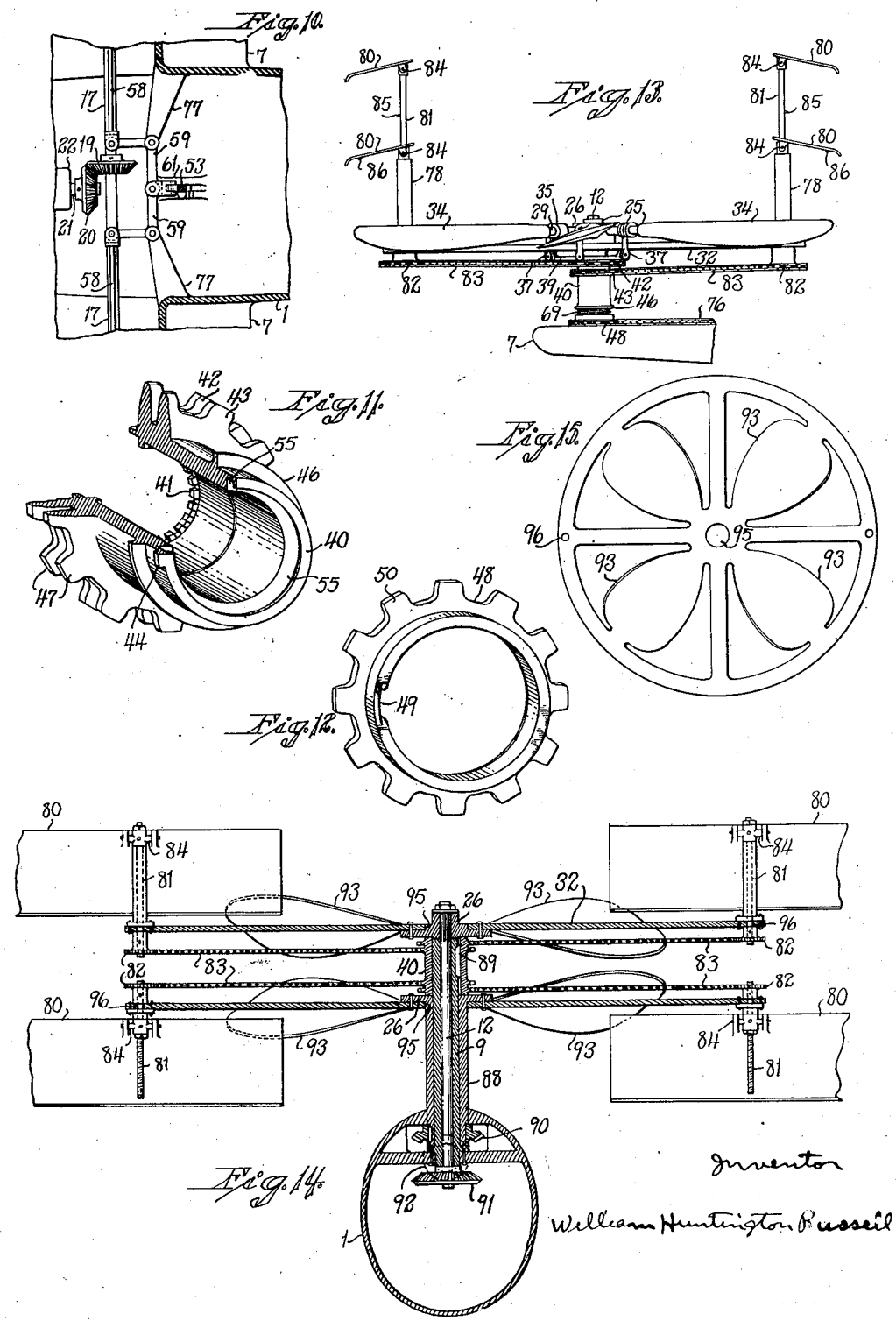

Patented Feb. 19, 1935

1,991,466

UNITED STATES PATENT OFFICE 1,991,466

COMBINATION AIRPLANE AND HELICOPTER

William Huntington Russell, New Haven, Conn.

Application August 25, 1934, Serial No. 741,462

20 Claims. (Cl. 244—15)

The invention relates to a combination airplane and helicopter, and especially to the methods of raising it vertically or propelling it horizontally. Two horizontal rotors are provided which revolve in opposite directions. Their blades are at a suitable angle to force the air downward when it is desired to raise the airplane vertically. When the airplane is travelling horizontally the angle of the blades is set to cut the air with as little air resistance as possible during their rotation.

One of the main features of the invention is the basic invention of propelling the airplane in a horizontal direction by a number of revolving wings which open or shut according to the air resistance. A further basic feature of the device is the method of holding the wings pointing in any desired direction during their rotation. Moreover, the direction which all the wings point during rotation may be changed during rotation; or one set of wings may be changed to rotate pointing in a different direction from the wings of the second set. In this way, the airplane may be steered by the driving wings as well as by the tail controls. This basic method of changing the angle of any of the wings makes it possible to maneuver the airplane very quickly. One set of wings can be suddenly changed to reverse without reversing the engine or using the clutch, turning the airplane around very quickly. By using my invention the course of the airplane can be varied in any direction either horizontally or vertically. This ability to maneuver quickly gives it an advantage over other airplanes.

Another feature of the invention is to create an almost noiseless plane by doing away with the propeller used in most planes.

Still another feature is to provide an airplane which can operate on less horsepower, thereby saving engine weight and cost of operation.

The invention, therefore, has among its features the advantages of being able to rise vertically from the ground at the start of a flight, landing vertically on a small landing field at the end of a flight; travelling vertically or horizontally; being able to use a weaker and therefore lighter engine; eliminating much of the noise, maneuvering quickly and many other features.

The invention is especially adaptable for landing on and taking off from the roof of a house with a light load.

In the drawings:

Figure 1 is a plan view of one form which a combination airplane and helicopter embodying the present invention may assume.

Figure 2 is a view thereof in front elevation.

Figure 3 is an enlarged plan view of one of the hubs of the lifting blades, the blades being broken away.

Figure 4 is a vertical central section of one end of the wing together with its lifting blades and associated parts on a larger scale.

Figure 5 is a sectional view taken on the line 5—5 of Figure 2.

Figure 6 is a transverse sectional view, taken on the line 6—6 of Figure 4.

Figure 7 is a similar view, taken on the line 7—7 of Figure 4.

Figure 8 is a similar view taken on the line 8—8 of Figure 1.

Figure 9 is a sectional view taken on the line 9—9 of Figure 8.

Figure 10 is a sectional view taken on the 10—10 line of Figure 9.

Figure 11 is detached perspective view of the sprocket member controlling the direction the forward propulsion blades must point during their rotation.

Figure 12 is a similar view of the index sprocket.

Figure 13 is a view in front elevation of one end of the wing and its lifting blades showing the blades in their lifting position, and the position the forward propulsion blades assume.

Figure 14 is a vertical, sectional view illustrating a modified form of the invention.

Figure 15 is a plan view of one of the lifting rotors shown in Figure 14, detached; and Figure 16 is a fragmentary view similar to the upper end of Figure 5 showing means for the positive return of the forward propulsion blades.

The parts shown in the drawings are positioned for forward flight unless stated otherwise.

In the preferred form of the invention the fuselage 1 of the airplane has an entrance to the pilot cock-pit at 2. A tail 3, part of which 4 may be moved upward or downward by any suitable control, is located at the rear of the fuselage and controlled from the cock-pit, a section of the cock-pit or cabin is shown in Figure 1. A steering tail rudder 6 may likewise be operated from the cabin by any convenient method, but the tail controls are not important to my main invention and are, therefore, not shown in detail. A main wing 7 shown in Figures 1 and 2 extends horizontally at right angles to each side of the fuselage and is attached to the fuselage by bolts or by any other convenient method. Two ailerons 8 extending along the rear side of the main wing 7, one on each side of the fuselage are attached to the main wing in any convenient manner. The position of each aileron in respect to the other aileron is regulated from the cock-pit by any convenient method. Near opposite ends of the main wing 7, in similar positions, one on each side of the fuselage, two corresponding hollow supporting posts or hollow supporting castings 9 are fastened in an upright position to the main wing 7 by screwing their corresponding lower threaded ends into corresponding threaded holes of equal bore through the upper surface of the main wing or by any other convenient method. Each hollow post 9 is very strong and is attached firmly to its main wing 7 by rivets 10 and braces 11. A rivet 10 passes through each brace 11, the base of each hollow post 9 and upper side of the main wing 7, Figure 4. Each hollow post 9 has a uniform bore throughout most of its length, but near its lower end the bore is of a smaller diameter. A separate shaft 12 fits within each of the two hollow posts 9 and likewise has a correspondingly smaller section at its lower end. The small lower end of each shaft 12 extends a short distance into the hollow part of the main wing 7 by extending through the small bore section of its hollow support 9. The diameter of each of the two shafts 12 is larger near its middle section than its two end sections. The middle and lower part of each shaft 12 have a diameter approximately equal to the upper and lower diameter of each hollow post 9. Each of the two shafts 12 fits within a separate hollow post and has its lower end extend a short way below the lower end of its respective hollow post. The upper end of each shaft 12 is of a somewhat smaller diameter than its middle section which fits within its hollow post 9, and the said upper end extends vertically upward a considerable distance beyond an upper end of its hollow post support 9. Each of the two shafts 12 fits within a corresponding hollow post 9, so that the lower larger diameter section of each shaft 12 will rest on a separate ball bearing support 13. Each ball bearing support 13 is of a size and shape to fit within the larger bore of its hollow post 9. A ball bearing support 13 is supported within each of the two hollow posts 9 on the flat surface which extends around the smaller lower bore of each hollow post 9 just above its smaller lower bore. The upper bore of each of the two hollow posts 9 is enlarged to allow separate second ball bearing support 14 to be supported on the enlarged flat surface which extends around the inside of each hollow post just above its adjacent main bore. Each upper ball bearing support 14 extends slightly above its corresponding hollow post 9. Each of the two shafts 12 can be rotated on its ball bearing supports.

A separate bevel gear cog 15 of sufficient shaft bore to fit over the lower end of each shaft 12 is attached to each shaft 12 by means of a set screw extending through its outer circumference and into a hole in its shaft. Each of the two downwardly extending bevel gears 15 have teeth on their lower side which mesh with the outwardly extending teeth of a separate similar bevel gear 16. Each of the two bevel gears 16 has a shaft bore of corresponding size which fits over the opposite ends of a single horizontal shaft 17. Each of the bevel gears 16 is held under an opposite side of its corresponding bevel gear 15 on the shaft 17 by a corresponding set screw which is screwed through a threaded hole in its outer circumference and into the shaft 17. The horizontal shaft 17 is rotatably held within the main wing 7 of the airplane. The shaft 17 extends horizontally through the cock-pit at right angles to the fuselage but within the main wing 7. There are two similar ball bearing supports 18 for the horizontal shaft 17, each ball bearing support 18 has a lower side at right angles to its upper side. The lower side of each support 18 is riveted to the main wing in similar positions. The two ball bearing shaft supports 18, each have a hole through its upper side for the horizontal shaft 17 to extend through, and the horizontal shaft 17 is supported so it can be rotated on ball bearings. One of the ball bearing supports is shown in Figure 4. The horizontal shaft 17 when rotated on its ball bearing supports will always have each of its two gear cogs 16 in mesh with a separate bevel gear cog 15. The teeth of each of the bevel gears 15 which are nearest the cock-pit, mesh with the teeth of its corresponding bevel gear 16 on the horizontal shaft 17, one of which is shown in Figure 4. Whenever the shaft 17 is rotated, its two bevel gears 16 will rotate their respective bevel gears 15 in opposite directions for this reason, as shown in Figure 2.

A bevel gear 19 of a shaft bore of sufficient size to fit over the horizontal shaft 17 is held firmly on the said horizontal shaft 17 within the cock-pit 2 by means of a set screw extending through the outer circumference of the bevel gear 19 and into the horizontal shaft 17. Another bevel gear 20 has a shaft 21 extending horizontally within the cock-pit 2. An airplane engine 22 is located within the cock-pit and attached to the fuselage. The engine 22, preferably can be operated at several different speeds and its shaft is connected by a clutch or other convenient method to rotate a substantially horizontal shaft 21 having its outer end adjacent to the engine shaft, at varying speeds. As I do not claim any special manner of connecting the engine to the substantially horizontal shaft, as it may be connected directly or through any appropriate gearing, I have not shown a clutch or any device for shifting gears. The substantially horizontal shaft is held in position by means of suitable supports attached to the sides of the cock-pit or fuselage, so the shaft may be rotated around its long end as its axis.

The engine 22 in the cock-pit, therefore, may operate freely, or through a clutch action and other devices may rotate a shaft. A bevel gear cog 20 is attached to the outer end of the shaft, so as to rotate with its shaft as its axis. The teeth of the bevel gear cog 20 mesh with the teeth of the bevel gear cog 19 as explained later and shown in Figure 2.

The upper end of each shaft 12 is threaded so that nuts 24 of correct bore and thread may be screwed onto the upper end of the said shaft 12. Each of two rotors 25, having a thick disk shaped hub 26 with a hollow bore through their respective flat centers, each fit snugly over the top end of a separate shaft 12. The smaller upper section of each shaft 12 passes through the bore in a separate hub 26, and the hub 26 is supported to rotate horizontally with its shaft 12 by having the lower flat surface of its hub rest on the top of its larger outer diameter section as shown in Figure 2. By screwing a separate nut 24 over the threaded upper end of each of the two shafts 12 against its respective hub 26, both hubs 26 are held firmly between the upper larger diameter of respective shafts 12 and nuts 24. Each of the two hubs will thus revolve with its respective shaft 12. As the engine 22 will rotate each shaft 12 in an opposite direction as already explained, each hub 26 will likewise be rotated by the engine 22 in an opposite direction. Each hub 26 has six corresponding holes 27 of equal bore and equally spaced at equal distances apart, extending into the side of each hub. The said holes extend from the outer center position on the circumference toward the center of the hub, as shown in Figure 3. At right angles to each of the holes 27 a second hole 28 is bored through the flat surface of the hub and each hole 28 passes through a corresponding hole 27. The round end of a separate spoke 29 of a more or less uniform diameter throughout its length approximately equal to the diameter of each hole 27, is inserted within each hole 27 as far as it will go. Each of the six spokes 29 is held in a corresponding horizontal position separately in a separate hole 27 by means of a separate bolt 30 which passes through a corresponding hole 27 in the hub, and elongated slot 31 in a spoke 29. Each bolt 30 and elongated slot 31 are positioned to allow its spoke 29 to oscillate, or rotate part way around within its hub hole 27.

Each bolt 30 is of sufficient length to extend vertically through the entire thickness of the hub and still have room for its nut 33 to be screwed to its threaded end. The lower part of each hub has a smaller diameter than its upper part as is shown in Figure 4. A separate wing supporting bar 32 which rotates wings, as will be more fully explained below, has a hole vertically through its center of a diameter approximately equal to the diameter of the smaller lower part of the hub 26. A separate wing supporting bar 32 fits over the lower section of each of the two hubs. When the hole in the center of each wing supporting bar 32 is inserted upward over the lower section of its respective hub 26 as far as it will go, the upper side of each wing supporting bar 32 will fit against the larger outer diameter section of its hub 26 directly above it, and the lower side of each wing supporting bar 32 will not extend below the base of its respective hub 26 as shown in Figure 4. Each of the six bolts 30 which pass vertically through each hub 26, also pass through a corresponding vertical hole in the wing supporting bar 32 and holds it in place on its hub 26 when its nut 33 is screwed over the threaded end of each bolt 30. The wing supporting bar 32 is not used when any wheel or disk, such as shown in Figure 15, is substituted for a hub 26 and its fan extensions as will be more fully explained below.

When the six spokes 29 are each inserted into respective separate hub holes, and a wing supporting bar 32 is inserted over the lower section of each hub, all the six spokes 29 and the wing supporting bar 32 are held by the six bolts 30 and their nuts 33 on a hub as the holes for each bolt are in alignment. Each hub 26 is similarly attached to its spokes 29 and wing supporting bar 32. In this way the two hubs, each have six spokes which may be oscillated or turned, and each hub has a wing supporting bar which extends horizontally an equal distance on opposite sides of the hub and rotates with the hub, as will be more fully explained below in connection with the wings which fly the airplane horizontally and are revolved by the two hubs 26 and the wing supporting bars in opposite directions.

The outer end of each of the six spokes 29, which extend outwardly from each hub 26, is inserted into a tight fitting hole extending into a small or bored out end section of the blade or fan 34, and each spoke 29 is fastened securely to its corresponding blade or fan 34 by a set-screw passing through one side of the smaller end section of the fan and into its spoke, or by any other suitable device. As there are six spokes 29, there are likewise six fans or blades 34. Each blade 34 is attached to its corresponding spoke 29 so that during the horizontal flight of the airplane each of the flat surfaces of these six blades 34 will be in a like position, forming a flat surface, thereby creating as little air resistance as possible during rotation around their common hub axis as will be explained more fully below. The middle section of each spoke 29 extends through a hole near one end of an arm extension 35 at a point near the small end of its fan 34. Each spoke 29 is held fast to its arm extension 35 by means of a set-screw passing through the arm extension 35 into its spoke 29, or in any other suitable way. When the outer end of any arm extension 35 is moved up or down, it will rotate its spoke 29 within the limits allowed by the bolt 30 as described above. Each arm extension 35 has a center section cut out near its outer end at 36, Figures 3 and 4. The upper end of a downwardly extending arm control 37 fits into this cut out section 36 and is pivoted within the said section 36 by having a bolt 38 pass horizontally through both sides of the cut out section 36 of the arm extension 35 and the upper part of the arm control 37. By pushing up or pulling down on the lower end of the downwardly extending arm control 37, the bolt 38 will act as a pivot for both the arm extension 35 and the arm control 37. Each spoke has a similar arm extension and arm control and similar connecting bolts. When any spoke 29 is rotated part of the way round its own axis, either up or down, its corresponding blade will change its angle accordingly, due to the connections as already explained. If all the arm controls 37 are moved an equal distance either way, then all the blades 34 will take similar positions due to their similar construction and adjustments. The lower end of each arm control 37 bolted to the spokes of a hub 26, is fastened at a corresponding position to a plate 39. The said plate 39 can be rotated by its arm controls 37 around the shaft 12 which rotates its adjacent hub 26, as the said shaft 12 passes through a hole of corresponding size through the center of the flat surface of the plate 39, Figures 3 and 4. A second plate 39 is likewise rotatable around the second shaft 12 by a similar connection to corresponding arm controls and like hub extensions and connections.

Referring again to the two similar hollow posts 9 located on opposite ends of the main wing 7, each has a smaller diameter across its upper part than across its lower part as shown in Figure 4 which gives a detail view of one of the posts 9. Two similar pipe shaped members or castings 40, one of which is shown in Figures 4 and 11, each have similar inside hollow bores throughout their entire length. Each casting 40 has inwardly pointing teeth 41 equally spaced apart around the inside upper inside end of its casting 40. The bore of each of the two castings 40 is uniform throughout its length except where the inwardly extending teeth 41 project into the said bore of each casting. The other casting 40 is likewise fitted on to the other hollow post 9. Either casting 40 can slide up or down a short distance on its hollow post 9 as an axis or be rotated around its said axis 9 except when held by controls as will be explained below. When either casting 40 is raised by levers to its top position on its upright support 9 by lever controls, described more fully below, the inwardly pointing teeth 41 will be raised to a sufficient height for the adjacent teeth 41a on each upright support 9 to enter the space between any of the two adjacent teeth 41a. As each tooth 36 is held stationary on its upright support 9, it will not allow the casting 40 to rotate around its upright support 9 as an axis when in this position. When the casting 40 is lowered by levers to a position below the teeth 41a it may be rotated on its stationary axis 9. Each of the two castings 40 has two exactly alike chain sprockets 42 and 43. The chain sprocket 42 is above the chain sprocket 43 on each casting, and each of the said chain sprockets has similar teeth 47 equally spaced apart extending out from their outer circumference. Each of the adjacent teeth 47 in either sprocket 42 and 43 fits between the adjacent links of a chain so that either of said sprockets can be rotated by an endless chain.

Two index sprockets 48 one of which is shown in Figure 12, each has a corresponding cut out section or gap 49 extending across its inner bore. The inside bore of each index sprocket is of a size to fit over the lower outside end of either upright posts 9. Extending outward around the outer circumference of each index sprocket 48, are a number of teeth 50 of a size and so spaced apart, for any adjacent tooth 50 to fit between the adjacent links of a chain. A separate index sprocket 48 is fitted over the base of each post 9, so that the inside bore of each index sprocket 48, fits around the lower outside surface of its adjacent upright post 9. Each index sprocket 48 fits over its post 9 so that it can be rotated around its post 9 support as its axis.

A single tooth 44 protrudes outwardly from the casting 40. A somewhat similar ring 46 extends uniformly around the circumference of each casting 40 a short distance above the tooth 44 on the same casting. Each of the two castings 40 has an inside bore of a size to fit over the lower end of either upright hollow post 9. The lower inside bore of one of the castings 40 is fitted over the upper outer end of one of the two upright hollow posts 9 and may be held so it can rotate around its outer post 9, by a device described below. The upper end of its post 9 is similarly placed over the other like casting 40. However, either casting 40 can be lowered on its post 9, so that when lowered it may be rotated around its post 9 as an axis, except when held so it cannot freely rotate or is held in one position, as will be explained below. When either of the two castings 40 is lowered vertically along its upright support post 9 to its lowest position, the outwardly extending tooth 44 on its casting 40 will be below a gap 49 extending across the inner surface of an index sprocket 48 shown in Figure 12 as will be further explained.

The raising or lowering of either of the two castings 40 along its corresponding upright post or axis 9, is accomplished by raising or lowering a corresponding vertical control rod 51 which is operated by connections to a clutch 53 located in the cock-pit. Each of the two control rods 51 extend vertically downward through a small open space 52 just above the lower end of each casting 40. This open space extends down the inside bore of each casting 40. The upper end of each vertical control rod 51, is attached to the axle of a corresponding wheel 54. Each rod 51 attached to its wheel axle, holds its respective wheel in an upright position within an open space 55 extending around the inner surface of each casting 40 just above its lower end, Figure 4.

This open space 55 must extend around the lower inside section of each casting 40 horizontally so that either casting 40 may be revolved around its axis 9 without interfering with either the wheel 54 or the rod 51 attached to the axis of its wheel. By raising or lowering a rod 51, its adjacent wheel 54 will raise or lower its respective casting 40 as either the upper or lower surface of the wheel 54 will come into contact with that part of the surface of the casting 40 which is directly above or below the open space 55 within which the wheel is located. Either of the two castings 40 may be rotated freely around its axis except when held so it cannot be rotated or its rotation is controlled as will be fully explained more below.

A separate control rod 51 having its long arm at right angles to its short arm, has an elongated slot extending through it lengthwise on its short arm. A second lever control 57 has a long arm at right angles to its short arm. The lever control 57 is attached to its adjacent brace 11 by having a pivot extend through a hole near its right angle section and brace, Figure 4. The long arm of the lever 57 is held adjacent to the elongated slot on the short control rod 51. A rivet or bolt passing through the elongated slot on the short arm of the control rod 51, and the outer upper end of the long arm of the lever 57, holds the respective arms of the control rod 51 and lever rod 57 together, Figure 4. This connection allows the bolt connection to slide within the slot on the short arm of the control rod 51 when the lower end of the short arm of the lever 57 is moved toward or away from the cockpit thereby raising or lowering the vertical long end of the control 51 and wheel 54. A like control device raises or lowers each of the two castings 40. A more or less horizontal rod 58 has one end pivotally attached to the lower end of the short end of the lever 57 by a bolt which passes through the said end of the horizontal rod 58 and its corresponding short lower end of its adjacent lever 57. The other end of the horizontal rod 58 is pivoted to the outer end of a clutch extension rod 59 likewise by a bolt or rivet. The other end of the clutch extension rod 59 is pivotally connected to the clutch 53, Figures 8 and 9.

Whenever wing supporting bars 32 are used, the rotors 25 or parts of said rotors and controls for raising the craft vertically may be taken off, and as an airplane the machine can still take the air after a run.

Each of the two castings 40 has a similar lever control for raising or lowering it on its axis, and each lever control is attached to the single clutch 53 but on opposite sides. The clutch 53 is fastened by a pivot 60 to a floor brace 61 in the cock-pit. The said clutch 53 extends vertically upward and has a handle on its upper end which can be moved forward or backward because of the pivot connection at its lower end. A spring 62 has one end attached to a clamp moveable up or down on the lower end of the clutch, and the other end attached to a ratchet attached to the floor brace. Whenever the clutch handle is moved to a desired position, either forward or backward from its former position, the spring 62 will pull the clamp on the clutch downward so that its lower end will be held between two adjacent ratchet teeth. In this way the clutch can be held in any desired position, and will remain in that position until the clamp 63 is released by raising it above the teeth on its ratchet. The clamp can be raised by any convenient method, such as a rod connecting the clamp and a lever handle on the upper part of the clutch handle. In this way the clutch may be held in different positions and will remain in any position until released by the pilot, as similar controls and connections extend from the clutch on the opposite side of the cock-pit and corresponding levers and controls raise each casting 40 at the same time.

The operation of the clutch 53 and the manner in which it operates its connections on both sides of the cock-pit is more clearly shown in Figures 4, 8, 9 and 10. The clutch rod 53 is connected onto one end of each of two corresponding right angled clutch extension rods 59. One of its two right angled clutch extension rods 59 is held on each side of the clutch 53 by means of a separate pivot passing through each corresponding right angle section of each clutch extension rod 59 and the end of a separate corresponding brace 77. The two braces 77 are similarly bolted or otherwise attached at corresponding positions on opposite sides of the fuselage. The other arm of each right angled clutch extension arm is pivotally connected to its corresponding horizontal rod 58. When the clutch 53 is pulled forward, the two said arms of the right angled clutch extension rod 59 will pull their respective horizontal rods 58 toward the center of the cock-pit as each right angled extension rod 59 will turn on its pivot connections passing through its right angled section. This clutch action as explained above lowers each of the two castings 40 and changes the angle at which both sets of blades cut the air during rotation by their respective hubs. Changing the position of the clutch 53 also determines whether the wings which fly the airplane horizontally will be subject to centrifugal control or controlled by castings 40. In this way any clutch action changes the angle of the blades on both hubs as well as other similarly connected parts on either side of the cock-pit in unison. The height of the two castings 40 and angle at which all the blades 34 cut the air during rotation is regulated in this way.

Referring again to the two hubs 26, I will now describe how each of the two plates 39 is raised or lowered, thereby raising or lowering all the arm controls 37 fastened to each separate plate 39. As each of the blades rotated by each hub 26 is attached to one end of a separate arm extension at 35, and since each arm extension has its other end raised or lowered by an arm control 37, it follows that by raising or lowering each plate 39, the angle at which each blade rotated by each hub cuts the air, will be determined by the height at which a plate 39 is rotated by its respective arm controls. The inside bore of each of the two plates 39 can be rotated around an upper projection 67 on its respective casting 40 as its axis, on ball bearings 65. The ball bearings 65 are located and held between the inner bore surface of each plate 39 and the adjacent casting projection 67 and are supported on the track 66. Both the casting projection 67 and ball bearing track 66 extend uniformly entirely around the upper end section of each casting 40. An annular nut 68 having retaining flange, is threadedly engaged with the internally threaded end of the bore of the casting 40, the said retaining flange clamping the ball bearings 65 in place. A second annular nut 68ª is threaded into the plate 39, clamps the track 66, holds the track 66 in position on the plate 39. When each casting 40 is lowered as already shown by its connecting controls operated by the clutch 53, the annular nut 68 will lower respective plates by pulling down on the upper side of the ball bearing track 65. Because of a ball bearing track adjacent to each plate as shown above, each plate 39 can be rotated by its adjacent hub through connections attaching it to adjacent spokes. Each casting 40 is normally held in its highest position on its hollow post support 9 by a spring 69 shown in Figure 4. The lower end of each spring 69 is located in a corresponding position above an outward projection 46 of a casting 40. The lower end of each spring under separate castings 40, rests on its adjacent index sprocket 48. The spring 69 is held in position by having an upward projection of each index sprocket 48 extend upward on the outside of its respective casting 40. The said spring 69 under each casting 40 will push upward against its casting and hold it in its raised position unless the two castings are pulled down at the same time to a lower position by the action of the clutch in the cock-pit, as already explained.

Although I have shown only one method of changing the positions or angle of each set of blades 34 when rotated by its hub 26, I do not limit myself to one method, but claim each and every method of changing and controlling the angle at which any blade will cut the air during its rotation, is within the scope of the claims. The method of raising or lowering each casting 40 and holding it at any elevation is not limited to one method, but any other method may be used and is claimed within the scope of this invention. Likewise any desired control may be used for keeping each casting 40 from rotating around its axis, and thereby regulating the direction which a set of wings may be held pointing during their rotation. The invention is not limited to the single methods already shown or described below in accomplishing the said results.

A detailed detached perspective view of part of one of the two similar pipes or castings 40, is shown in Figure 11. One of the two castings 40 fits over one of the two upright hollow posts 9, and is slidable up or down on its respective post as its axis with its protruding inward teeth on the upper end. The second pipe or casting likewise fits over and slides up or down the second upright hollow post 9 in like manner. One of the functions of each of the said two castings 40, is to control the direction of all the wings in an adjacent set of wings revolved by its wing supporting bar 32, are held pointing while revolved by its said wing supporting bar 32. The spring 69 under the separate castings 40, each hold their adjacent casting 40 in its upper position unless the said two castings 40 are lowered by the operation of the clutch 53 and its connections to a lower corresponding position. When in its highest position the inwardly projecting teeth 41 of each casting 40, are engaged with corresponding teeth extending outwardly from its adjacent post 9, as shown in Figure 6 which is a sectional view, taken on the line 6—6 of Figure 4. As the adjacent post 9 cannot be rotated due to its main wing connection, the casting 40 is held in its highest position stationary in respect to its adjacent post 9, due to the meshing of corresponding teeth on the said casting 40 with the teeth of its adjacent post 9. Each casting 40 is held in the same way to its adjacent post 9 at the same time, as each casting must move up or down at the same time due to the clutch connections explained above. When the clutch 53 is pushed forward each casting 40 is lowered a corresponding distance. When both castings are lowered so that their respective teeth 41 are out of mesh with corresponding teeth on their respective posts 9, each casting 40 has its lower single protruding tooth 44, within the gap 49 of corresponding size which extends inwardly from the inside ring of the corresponding index sprocket 48 adjacent to each casting 40. One of the index sprockets and its single gap is shown in Figure 12. Due to the width of the gap ring on each index sprocket 48, the single tooth on each casting 40 will remain held within the corresponding gap of its index sprocket until the two castings 40 are at their lowest respective positions. Until freed at their lowest positions, each casting 40 cannot rotate freely around its axis, but its rotation is governed by the rotation of its adjacent index sprocket 48 except when in its top or lowest position. Thus in a top position each casting 40 and its index sprocket 48 cannot be rotated as each casting 40 is held to its adjacent post 9. When lowered to the middle position, each casting is freed from its adjacent post 9, and may be rotated by its index sprocket which is still attached to it by the single tooth 44 within the gap 49. When lowered to its bottom position by the clutch 53 and its connections, both castings 40 will be freed from their respective index sprockets 48. In the bottom position each casting 40 may be freely rotated around its adjacent post 9 as its axis. In the lowest or bottom position, the centrifugal force exerted on the nearest set of wings during their rotation by the engine, will rotate their nearest casting 40 with the wings due to the endless chain 83 connections between each separate sprocket on each of the castings 40 and its nearest sprocket on the adjacent wing shaft 81.

The raising or lowering of each casting 40, also determines the angle at which the adjacent blades rotated by an adjacent hub 26, will cut the air as already explained. When any hub 26 is raised to its highest position the upper surface of the adjacent blades 34 will be flat, so as to eliminate as much air resistance as possible. When at its lowest position each blade 34 will be at an angle to force the air downward and thereby raise the combination airplane and helicopter more or less vertically upward, as shown in Figure 13. At the lowest position the centrifugal force on the wings 80 can rotate respective hubs 26 around adjacent posts 9. When the blades 34 are at an angle to resist the air to the greatest extent during rotation, the wings 80 may swing out by centrifugal force without much air resistance. When in their highest position the wings 80 create their maximum air resistance during rotation and the blades the minimum. In this way there is a great saving of horse power. I want it clearly understood that it is possible to adjust the blades 34 so that they still can rotate and raise the combination airplane and helicopter vertically or at least hold it at any elevation, at the same time that the two castings 80 are held from rotating by their respective index sprockets. It is an advantage to have the blades 34 cut the air at an angle to hold the airplane or helicopter from falling at the time when the wings are brought under correct control to start the airplane or helicopter moving horizontally. After sufficient more or less horizontal speed is obtained, the blades can be further flattened out so as to lessen air resistance. Thus both the blades can be positioned to raise the machine vertically at the same time the wings are positioned to fly it horizontally; or either the blades can be set to create as little air resistance as possible while wings create a maximum air resistance, or vice versa. This provision is very important in starting a horizontal flight after the desired vertical height has been obtained. It is also important in hovering, or just as the airplane or helicopter is about to land. It is also an advantage when there is a wind blowing to offset the force of the wind.

Two brace rods 71 attached to one side of the cockpit, one above the other, each have a similar vertical round hole through it, so that one hole is directly above the other. A vertical shaft 72 passes through both those vertical holes. A horizontal index chain sprocket 73, with a bore through its center of a correct size, is fitted tightly over the lower end of its shaft 72, so that the horizontal index sprocket 73 can be revolved by its shaft 72 under its lower brace rod 71. A pilot wheel 74 is held in a horizontal position on the upper part of the shaft 72 as the upper end of the said shaft 72 extends tightly through a center bore through the said pilot wheel 74. The small end of an upright handle 75 is inserted through a hole of equal bore extending downward through the outer flat surface of the said pilot wheel. A similar pilot wheel 74 and similar other connections are held in a similar way at corresponding positions on the opposite side of the cock-pit. A second shaft 72 has a similar horizontal index sprocket 73 held on its lower end in like manner, Figures 8 and 9. Each of the horizontal index sprockets 73 has teeth around their outer surface. The adjacent teeth on each horizontal index sprocket 73 correspond to the space between the adjacent links of an endless chain 76. The endless chain 76 is of just sufficient length to extend around the teeth horizontally of any index sprocket 73 and the teeth of its nearest corresponding index sprocket 48. The chain 76 connects both sprockets 73 and 48 so that the teeth of each sprocket 73 and 48 will go between the links of the chain 76 when both of said sprockets are rotated in either direction. A similar second endless chain extends likewise around the two adjacent sprockets 73 and 48 located on the other side of the center of the cockpit. The second chain like the first chain is of a correct length to correctly turn its two sprockets by having any two adjacent links spaced to fit over any adjacent teeth on either of said sprockets. When either handle of either pilot wheel is rotated part of a revolution, its adjacent index sprocket 73 and chain connections will revolve its corresponding index sprocket 48 in accordance with the gearing ratio between the two said sprockets. Preferably the two chain sprockets on each chain are of corresponding size, but this is not essential.

The operation of the clutch from the cockpit determines whether the airplane will fly more or less vertically or horizontally, as will be explained in more detail below. The turning of either pilot wheel 74, when its nearest casting 40 is held by the spring 69 in its middle position in respect to its upright support, determines the direction at which its corresponding set of horizontally revolving wings 80, shown in Figure 2 will fly the airplane. Either set of wings 80 rotated by either shaft 12, may be held pointing in any direction during its entire revolution by its respective pilot wheel 74. When either pilot wheel is turned, the direction of all wings controlled by the pilot wheel are turned.

The parts of the combination airplane and helicopter designed for raising it vertically by rotating its two sets of blades 34, so as to force the air downward has been described, and the various parts used in connection with the previously described parts for flying the airplane more or less horizontally will now be described.

A separate upright hollow post 78 is attached in a vertical upright position to each of two opposite ends of a wing supporting bar 32. As there are two supporting bars 32 there are four upright hollow posts 78. Each hollow post 78 has one end of its outer side of a size to fit into the lower end of a hole of equal bore extending through its supporting bar 32, as shown in Figure 2. A separate flange 79 with a lower inside bore to fit over the lower outside end of each of the four upright hollow posts 78, is attached onto each of the said lower ends of the four upright posts 78. A corresponding lower end of each post 78 is inserted into a corresponding lower hole through its supporting bar 32, the separate flange 79 on each hollow post 78 is bolted tightly against its supporting bar 32. Each hollow post 78 can in this way be held tightly against its supporting bar 32 with its lower end extending through and below its supporting bar at any desired distance. There are two hollow supporting posts 78 on each supporting bar 32, one located near each opposite end. One of the upright hollow posts 78 on each supporting bar 32 extends preferably a slight distance below its corresponding end of its nearest bar 32.

A separate shaft 81 of a uniform diameter throughout its length and approximately equal to the bore of each upright post 78 passes through the said bore of corresponding hollow post 78 so that its upper end will extend a considerable distance above its hollow post 78. The lower end of one of each pair of shafts 81 on a single supporting bar 32 extends slightly below the lower end of the other shaft on the same supporting bar 32. As there are four hollow posts 78, there are four shafts 81 and each of said shafts extends entirely through the bore of its respective hollow post 78. The lower end of any shaft 81 is held in elevation just below a corresponding elevation of a sprocket on each casting 40 when in its highest position. Four separate chain sprockets 82 each of a diameter equal to the diameter of either chain sprocket 42 and 43 on the two castings 40, have a corresponding bore through their corresponding centers of their flat surface so that each chain sprocket 82 fits tightly over the lower end of a separate corresponding shaft 81. Each chain sprocket 82 is rotated horizontally by the lower end of its adjacent shaft 81. The elevation of each chain sprocket 82 corresponds to the elevation of its nearest chain sprocket 42 or 43 on its nearest casting 40, when in its raised position. As the chain sprocket 42 is higher than the chain sprocket 43 on each casting 40, one of the chain sprockets 82 is held at the same elevation as its nearest sprocket 42, and the other sprocket 82 is held at the same height as its adjacent sprocket 43. The second set of chain sprockets 82 likewise are held at corresponding height to their adjacent chain sprockets 42 and 43 on the other side of the cock-pit. Pulleys and belts may, however, be substituted for sprockets and chains.

The diameters and teeth of each of the two sprockets 42 and 43 on each of the two castings 40 are similar to the diameters and teeth of the four chain sprockets 82. A separate endless chain 83 of sufficient length extends around the upper sprocket 82 on one of the shafts 81 and its corresponding upper sprocket 42 on the casting 40, so that the teeth of each of said sprockets will fit within the links of its chain 83 when the sprockets are rotated around their respective axes. The adjacent lower sprocket 82 and corresponding lower sprocket 43 on the same casting 40 likewise have an endless chain of correct length to fit around both sprockets 82 and 43 so that the adjacent teeth of each of said sprockets fit within the corresponding links of the chain 83. On the other side of the cock-pit the teeth of each of the two sprockets 82 are likewise separately connected by means of a separate and similar chain 83 to its corresponding adjacent sprocket on the casting 40 as shown in Figure 2.

There are, therefore, two endless chains rotated or held from rotating by one casting 40, and two other chains, rotated or held from rotating with respective sprockets by the second casting 40. The rotation or non-rotation of each sprocket 42 and 43 with its casting 40 depends on the height each casting is raised by the clutch 53 in the cock-pit.

A separate wing 80 of any desired shape is attached to one side of a hinge 84 near the center of its upper section. The other side of the hinge 84 is bolted or otherwise connected to one of the shafts 81 near its top. The wing 80 will normally hang down vertically on its hinge 84 due to gravity, but the hinge 84 will allow its wing to be raised to a more or less horizontal position or lowered to a more or less vertical position. One or more wings 80 may be attached by a separate hinge 84 to any shaft, one above another. In Figure 2, I have shown two wings 80 on each of the four shafts 81 and each wing 80 is attached by a separate hinge to a corresponding wing shaft 81 so that the lower side of the top wing on each shaft 81 is directly above the upper side of the bottom wing on the same shaft 81. Each of the four shafts 81 should under most circumstances have the same number of wings attached to it, and each wing should correspond in size, shape and construction to a corresponding wing on each of the other shafts 81, in order to have a uniform wing rotation on each shaft. Each wing as shown in the drawings has a curved lower end. I do not, however, limit myself to any construction, shape or number of wings on each shaft, or the manner of fastening each wing to its shaft, as these may all be varied within the scope of the claims according to conditions. Although uniform construction and number of wings on each post is desirable in many ways, my invention includes a variation in number, construction and means of attaching wings on any posts, and therefore, is not limited to using a hinge.

As partly explained before in taking up different parts of the invention, the engine 22 located in the cock-pit 2, should be of a make to run at different speeds unless a gear shift is provided. The engine 22 is connected by clutch or other action to rotate its horizontal shaft 21 at different speeds. The teeth on the bevel gear 20 on the upper end of the engine shaft mesh with the teeth of the bevel gear 19 on the horizontal shaft 17. The two bevel gears 16, one on at each opposite end of the horizontal shaft 17, each rotate their respective bevel gear cogs 15 in opposite directions as each bevel gear cog 15 has its teeth in mesh with its bevel gear 16 on opposite sides. The two bevel gears 15 will rotate their respective vertical shafts 12. Each of the two vertical shafts 12 rotates a separate hub 26. Each hub 26 rotates its respective blades 34 and wing supporting bar 32. Each wing supporting bar 32 rotates with its hub 26 and rotates its two vertical upright hollow posts 78. Each hollow post 78 rotates with its respective shaft 81 around its respective hub 26. The rotation of each shaft 81 around its own axis within its hollow post support 78 during its revolution with its hub 26, is determined by the rotation or non-rotation of its adjacent casting 40. The sprockets 42 and 43 control the revolution of corresponding shafts 81 around their own axes, by means of the chains connecting its corresponding sprocket 82 on its shaft 81. Each wing 80 is hinged to rotate with its adjacent shaft 81. Should the casting 40 be held stationary by its upright hollow post 9, during the rotation of a shaft 12 within its hollow post 9, the wings 80 rotated by a shaft 12, will continue to face in the same direction during their entire revolution around their respective shafts 12. If both wing shafts 81 revolved by the same wing supporting bar 32, are on the same side of their respective wings 80 at the beginning of a revolution with their supporting bars 22 of said wings 80, each will be held facing in the same direction and on the same side of its shaft 81 during its entire revolution.

When any wing 80, curved on its side which is opposite from its hinge connection, is momentarily in a more or less horizontal position during its rotation and its adjacent casting 40 is held so it cannot rotate as described above, the curved side will extend downward. If the curved side is pushed to rotate against air resistance, the said curved side will quickly be forced downward and its wing will take a more or less vertical position with its lower curved end resting against its shaft or post support. When in a vertical position and pulled by its hinge in the opposite direction, it will come to a more or less horizontal position and the curved downwardly extending end will push the air downward, thereby helping to keep the airplane at the same elevation. The curved surface may therefore aid in holding an airplane at a desired height or quickly bring its wing to a more or less vertical position. Except when revolved each wing will normally hang vertically down on its hinge 84 due to gravity. All the wings 80 are normally attached to their respective shafts 81 to hang on the same side of each shaft 81 and face the same direction. A shock absorber 85 or 86 is on each wing 80 or its hollow post 78 as shown in Figure 5. When either wing supporting bar 32 is revolved by the engine as already explained, its two adjacent wing shafts 81 will be rotated. When in any opposite position wings on one shaft will generally be in a horizontal position while the wings on the other shaft will be vertical. When the air resistance pushes the lower part of each wing away from its shaft 81 or supporting post 78, it may be raised to a more or less horizontal position. By having the lower section of each wing curved downward when in a horizontal position, the air resistance pushing toward its shaft or supporting post 78 will push it downward to a vertical position. Thus the wings will be raised or lowered according to air resistance during rotation on their respective wing supporting bars 32. When each set of wings 80 is revolved they will close by air resistance and push against the resistance travelling in one direction, but will be opened by the air resistance when travelling in the other direction. Each wing will thus close to drive the airplane forward, or open to lessen air resistance when travelling in an opposite direction. When there is little wind and the wings are revolved at sufficient speed, each wing 80 will take both a horizontal and also vertical position during each revolution.

I want it clearly understood that I do not limit myself to the special way of hinging a wing to its shaft. One or more hinges may be used and attached directly to a wing and shaft, or to a wing and bar extending from the shaft; or in any other convenient way. Although I have shown a combination airplane and helicopter designed with only one main wing such as used in a monoplane, I want it understood that the various parts of my invention may be used on a biplane or any design. In a biplane, the horizontal driving wings 80 will preferably be located to operate between the two main wings of the biplane, will rotate on respective shafts held to each wing. However, the wings may if desired be located to rotate above or below either wing.

By turning one of the pilot wheels 74 in the cockpit part of a revolution, its nearest casting 40 is rotated an equal amount due to the endless chain 83 around corresponding sprockets. The set of corresponding wings 80 just above a casting 40 are likewise turned an equal amount by respective chains around corresponding casting sprockets and sprockets on an adjacent shaft 81, as already explained. All wings 80 on one of the two respective shafts 81 can, therefore, only rotate on its supports facing in whatever direction the pilot wishes. The direction of either set of wings 81 may likewise be changed as desired during rotation by turning its pilot wheel 74, accordingly. By making a half turn of either pilot wheel 74, one set of wings can be made to open at just the opposite time and position it would have opened had not its pilot wheel been turned one half a revolution. Its closing time and position may likewise be reversed. This reversal of one set of wings makes it operate against the air in a directly opposite way and acts to fly one side of the airplane in an opposite direction. The airplane could be turned around very quickly in this way. Moreover, if there is a slanting wind, both sets of wings or either set, can be turned to any desired angle to offset a slanting wind and remain in this position in reference to the fuselage during revolution. Under most conditions the two sets of wings will be set to push against the wind in their downward position when they pass by the nearest side of the fuselage. The controls are generally set so that all the wings 80 in both sets will hang vertically downward when passing nearest to the fuselage. Under usual conditions one set of wings will be open on one side and closed on the other side due to their moving in opposite directions.

In Figure 5, I have shown two wings 80 on one shaft 81, and shown each wing 80 in both a vertical and horizontal position. The lower wing has one end of a spring or shock absorber 86 attached to it near its lower center. This shock absorber 86 comes against a piece of rubber on the post 78 when the wing drops to its vertical position. The upper wing 80 in Figure 5 likewise is shown coming into contact with a somewhat different shock absorber 85 attached on its shaft 81. One end of the spring shock absorber 85 is screwed into a corresponding hole in the side of the shaft 81, and has a rubber bumper on the outer end of the spring.

In Figure 16 I have shown a positive means of closing a wing 80 to its vertical or downward position. This positive means consists of a spring 87 having one end attached to its shaft 81 or any suitable part revolving with the said shaft, and the other end of the spring 87 attached to the lower outer section of the wing 80. When the wing is raised horizontally the spring 87 will be at tension. When the wing hangs down vertically there is no tension on the spring.

In Figure 13, I have shown the position and angle at which the blades 34 rotate when raising the airplane vertically. Figure 13 also shows the position or manner in which the wings 80 are held out by centrifugal force so as to lessen the air resistance of the rotating wings 80 when the plane is rising vertically. The centrifugal force on either set of wings 80 can rotate its adjacent casting 40 through sprocket and chain actions, as each casting 40 is released in its lowest position from its adjacent tooth 44, so that the casting may be rotated around its axis freely by the centrifugal force on the wings 78 during their rotation.

In Figure 14, I have shown in sectional view a somewhat modified form of the invention. In this form of airplane or helicopter one hub 26 is located to rotate around the single shaft 12. The upper hub 26 is firmly held to its shaft 12 which may rotate within its upright support 9. A nut over the upper threaded end holds its shaft 12 within a post 9. The lower hub 26 is attached in any convenient manner to rotate with a pipe shaft 88 which fits to rotate around the post 9. A single casting 40 is adjacently located between each hub 26, and is held from rotation on its upright support 9 by a key 89. Blades 93 are attached to each hub 26. A wing supporting bar 32 is likewise provided and attached to each hub 26. A similar wing system as already shown is attached to rotate with each wing supporting bar 32 and respective wings are rotated with respective hubs. However, I have only shown one wing at each end of each supporting bar in Figure 14. The wings rotated by the upper wing bar 32 rotate above the said wing bar, but the wings rotated by the lower wing supporting bar 32 operate from like shafts and controls extending vertically downward below its wing supporting bar 32. Wings rotated by the lower wing bar 32 are attached by hinges from the upper end of the downward extending wing shafts 81.

A horizontal bevel gear cog 90 is attached within the cock-pit to rotate on and with the pipe shaft 88 as its axis. A second horizontal bevel gear cog 91 is located under the bevel gear cog 88 and is attached to the shaft 12 so as to rotate with its axis. A bevel gear 92 on the engine shaft is held at right angles to both the shaft bevel gear cogs 90 and 91 so that its lower teeth are in mesh with the teeth on the bevel gear cog 91 and its upper teeth mesh with the teeth of the bevel gear cog 90. In this way the bevel gear cog 92 on the shaft from the engine can rotate the two said bevel gears in opposite directions. Thus the two hubs 26 will rotate in an opposite direction. In this way blades 93 attached to each hub as shown in Figure 14 will rotate in opposite directions as well as each set of wings. All parts are controlled as previously shown. In Figure 14 only one casting 40 with four chain sprockets is used. Each chain sprocket has an endless chain around it and its nearest adjacent sprocket 82. In this case the casting 40 cannot be rotated on its axis.

In Figure 15, I have shown a wheel or disk having fan shaped members or blades 93 set at an angle and attached between the hub section of the said wheel and its outer rim. A wheel or disk such as shown in Figure 15, may be substituted for each of the two entire rotors 25. A hole 95 through the hub center of each of said wheels is provided for it shaft. When a wheel or disk is used as a rotor, the two wing shafts 81 are attached to the rim of each wheel in any convenient way. Rim holes 96 are provided for this purpose. Any oscillating or rotating blade or fan 34 may be substituted for a fan shaped member 93 in the wheel or disk and operated like any fan blade 34.

The use of the different parts of the machine described above and the manner of flying in either a more or less vertical or horizontal direction will now be described. Before starting a flight on a calm day it is advisable for each wing 80, in the two separately controlled set of wings, to face in the same direction. The clutch 53 should first be set in its middle position. This will lower both castings 40 from their top position and disengage the inner upper teeth of each casting 40 from meshing with corresponding teeth on its hollow post 9. Either casting can now be turned by its nearest pilot wheel 74 to face in any direction. The sprocket wheel 73 on the lower end of each pilot wheel shaft is connected by an endless chain attached to its nearest index sprocket wheel 48 on its nearest post 9. The single tooth 44 on each casting 40 is positioned within the gap 49 on its adjacent index sprocket when the casting 40 is held in its middle position. When the casting 40 is in its middle position its rotation is controlled by the nearest pilot wheel as already explained. As the position of each casting 40 controls the direction all the wings of one set must face, it is only necessary to turn one pilot wheel to change the position of one set of wings. Each pilot wheel should, therefore, be turned so that all the wings of both sets hang vertically down on the rear of their respective hinges. All the four wing shafts 81 should, therefore, be in front of their wings. Each wing should be positioned at more or less right angles to the fuselage, and each wing should be located in back of its adjacent shaft as shown in Figures 1 and 2.

The clutch 53 is now moved as far forward as possible, thereby lowering each casting to its lowest position on its support, as already explained. As each casting 40 is lowered, it will change the angle of all the blades 34 from a top flat surface to an angle for greater air resistance during rotation, as shown in Figure 13. Each casting 40 in its lowest position will have its single tooth below the gap in its adjacent index sprocket, and each casting 40 can then be freely rotated on its support without interfering with an index sprocket adjacent above it. The engine should now be started at low speed. Its shaft is then gradually attached directly or through appropriate gears and clutch, to the lower end of the vertical shaft 21. As already explained, the two rotors 25 will now start to rotate slowly in opposite directions, thereby forcing the air downwards by their respective rotating blades 34. All the blades on both rotors are now positioned to force the air downward during their rotation. By increasing the speed of rotation of the engine shaft, or through a change of gears, the shaft 21 may be rotated at any desired speed. When the shaft 21 is rotated at sufficient speed, each of the two rotors 25 will be rotated at a sufficient speed to cause their respective blades to force the air downward sufficiently to raise the combination airplane and helicopter more or less vertically off the ground. While the two rotors 25 are raising the airplane or helicopter more or less vertically, all the wings 80 rotated by either rotor 25, will swing around with their respective shafts and wing supporting bars 32. Each wing during its said rotation will be acted upon by centrifugal force, and its end opposite its hinge, will swing out horizontally as shown in Figure 13. Each wing will hold this horizontal position during its entire revolution. By means of the endless chains around wing shaft sprockets and corresponding sprockets on each casting 40, as elsewhere explained, the two castings 40 will be rotated around their axes by the centrifugal force acting on their nearest set of wings. When the airplane or helicopter has reached a desired elevation, the clutch 53 is gradually pulled back to its normal upright position. Shortly before the clutch comes back to its maximum position, and while the blades 34 are still lifting or holding the airplane at its present elevation, the tooth 44 of each casting 40 will become engaged in the gap 49 of its adjacent index sprocket 48. As each casting 40 will now be held from turning on its axis by its index sprocket 48, each set of wings 80 cannot now be freely held in a horizontal position by centrifugal force during their entire rotation. The index sprockets rather than centrifugal force will now control the rotation or non-rotation of each casting 40. If the index sprockets are still held in the same stationary position, each wing during its rotation will be held pointing in the same direction as set before the start of the flight, because the position of the gap 49 in each index sprocket has not been changed, and therefore, the single tooth on each casting 40 will take its former position in its gap 49. Each casting 40 will, therefore, again assume its previous position and will hold its corresponding set of wings facing the same direction as set before the start of the flight.

As each wing 80 is now rotated with its rotor connections, it will push against the air when in vertical position when travelling in one direction as it passes on the side nearest the cock-pit. Its downward position is due to the fact that its lower side comes against its shaft 81 or post support 78. When passing on the opposite side, each wing will be moving in the opposite direction. As its shaft 81 and post support 78 are still on the same side, but the air resistance is now coming in the opposite direction, each wing will avoid as much wind resistance as possible by having its lower side swing up and take a more or less horizontal position. Wings will, therefore, assume a vertical position in driving the airplane forward on one side, but when the air resistance comes in the opposite direction, it will lift each wing to a horizontal position. There is greater air resistance when each wing is held vertically down against its axis or post than when in a horizontal position, and therefore, the wings in a vertical position push the airplane or helicopter forward. Thus all the wings on each shaft will pass nearest the cock-pit in a vertical position. The wings on the shaft in each set will also pass the fuselage at the same time going in more or less the same direction, thereby creating an equal wind resistance and pushing the craft forward. As each wing rotates, one of its ends will cut the air in either a vertical or horizontal position at all times except when it resists the air in its vertical position. When the airplane has gained sufficient speed in its more or less horizontal flight, the clutch in the cock-pit is generally pulled back to its furthest position in order to close all the blades on each rotor 25 so as to form a flat upper surface and thereby avoid air resistance in the horizontal flight. This action allows almost all the engine power to be used for driving the airplane forward by its wings 80, as the blades will now cut the air during rotation and forward flight with little resistance. The tail rudder, tail controls and ailerons and other devices used in most planes can also be used in my combination airplane and helicopter for further elevation, direction or in landing or otherwise.

In case of a slanting wind, or should other weather conditions make it advisable, either set of wings can be turned to face in any other direction and hold that direction during rotation by simply turning and then holding one or both index wheels accordingly. By turning one wing half way around it will operate in the reverse, thereby turning the airplane or helicopter around quickly and in a small space. Thus one wing can be put in reverse while the other wing drives the airplane forward.

In landing, wings can be turned to offset any winds coming in any direction, so that the airplane can land on a roof or small landing field. Before landing or at other times wings can be turned to operate against each other. This might be advisable at time when it was desired to hover over one spot.

The airplane can be landed by the methods in general use. My invention may use another method of landing. When approaching or directly over a landing field, the two sets of wings can be turned to offset any air resistance while in rotation, or they can each work somewhat against each other or against the air, thereby slowing down or bringing the combination airplane and helicopter into a hovering position. By pushing the clutch part way forward the blades on each rotor will open somewhat. If the engine is now run at a correct speed the blades of each rotor will be turned just fast enough to allow the airplane or helicopter to gradually lose its elevation and settle slowly toward the landing field. Should an adverse wind be present the wings can be turned to offset the air resistance and hold the airplane or helicopter above, or at any position desired in reference to the landing field.

By pushing the clutch entirely forward, centrifugal force will hold the wings out horizontally during rotation, but the blades 34 on each rotor will still cut the air during rotation.

Likewise if an adverse wind is present at the time a flight is about to begin, the wings may be set at an angle to offset this air resistance and the airplane and helicopter can be made to rise vertically in spite of the wind. In order to hasten the closing of wings to vertical positions, I have provided curved sides as shown in Figure 5. I have also provided a positive aid as shown by the spring in Figure 16. I do not limit myself to any special positive aid of closing wings, or shape of wings. These may be varied within the scope of the claims. Wings may open or close entirely by air resistance, or any positive aid may be employed in my invention to assist in either opening or closing wings.

Wings may be hinged directly to their respective shafts or to an extension from any shaft. One or more hinges or other method of attaching wings may be used in my invention.

Although I have shown six blades attached to a hub for vertically lifting the aircraft, a larger or smaller number of blades can be used on each rotor as desired. A smaller number has the advantage of less weight.

Each and every convenient method of controlling both blades and wings to fly the airplane either vertically or horizontally, or to gain or hold any elevation and go in any direction is also claimed. My invention is not limited, therefore, to the one method shown.

As each vertical wing may resist the air during its revolution for almost the entire distance of its rotation diameter, it need not rotate as rapidly as a propeller which cuts the air at an angle. This will, therefore, eliminate much noise and save power in horizontal flight.

Various parts of the device as above described are claimed as a basic invention, and especially I claim the method of holding the rotating wings pointing in any direction, as basic, during their entire revolution. I further claim as novel and basic the means of raising an airplane vertically while rotating all of its horizontal flying blades, and means of connecting wings to either rotor. The controls for either flying vertically or horizontally are not limited to the method already shown.

What I claim is:

1. In a combination airplane and helicopter, a fuselage, a cock-pit in the fuselage, a laterally extending main wing disposed adjacently extending on each side of the head of the fuselage, a tail on the fuselage, steering and uplift rudders connected to the said tail, said steering and uplift rudders and controls operated from the cock-pit; an engine disposed in the fuselage, a substantially vertical shaft extending outward from the engine, means connected to said engine and shaft for rotating the shaft at different speeds, means for releasing the shaft from being rotated by the engine, a bevel gear connected to said shaft for rotating a second bevel gear on a substantially horizontal shaft extending across the cock-pit within the laterally extending wing on both sides of the cock-pit, supports attached to the main wing for holding the horizontal shaft so it can be rotated, two bevel gears on the said horizontal shaft, one near each opposite end, each of said two bevel gears having teeth on their outer surface which are in mesh with teeth of a separate corresponding bevel gear, each corresponding bevel gear is rotatably held on the lower end of a corresponding shaft, each of the two corresponding shafts extend substantially vertically upwards from their bevel gears through a separate hollow supporting member, each of the two hollow supporting members are attached to the main wing at similar positions on opposite sides of the fuselage; a hub attached to each upper section of each of the two substantially vertical shafts and rotatable by each shaft to which each hub is attached, each of the two hubs having one end of a number of lateral spokes attached to it so that each of said spokes can oscillate, the other end of each lateral spoke is inserted through the one end of a separate corresponding blade, one end of a separate arm connected to each spoke, the upper end of a separate vertical arm control pivotally attached to the other end of each arm, a separate plate attached to rotate around each of said upright supports when rotated by the lower end of said arm extensions which are attached to said plate, each plate is connected to a corresponding pipe casting rotatable on one of the upright supports as its axis, each casting having two chain sprockets around its outer surface; lever controls operated from the cock-pit attached to each casting to raise or lower its respective casting on its support, two hollow upright supports on each wing supporting bar, a separate shaft extending through each supporting bar and rotatably held to each supporting bar, a separate sprocket on the lower end of each of said shafts, a separate endless chain extending around the teeth of each of said sprockets and one of said equal sprockets on its nearest casting; one or more wings hinged to each upper end of said shafts and means for holding each of said wings pointing in one direction during the rotation of its shaft by means of the engine through various connections.

2. In a combination airplane and helicopter, a fuselage, a cock-pit in the fuselage, a laterally extending main wing disposed adjacently extending on each side of the head of the fuselage, a tail on the fuselage, steering and uplift rudders connected to the said tail, said steering and uplift rudders movable by controls in the cock-pit; an engine disposed in the fuselage, a substantially horizontal shaft extending outward from the engine, means connected to said engine and shaft for rotating the shaft at different speeds, means for releasing the shaft from being rotated by the engine, a bevel cog connected to said shaft and having its teeth mesh with the teeth of a second bevel cog on a substantially horizontal shaft extending across the cock-pit within the laterally extending wing on both sides of the cock-pit, supports attached to the main wing for holding the horizontal shaft so it can be rotated, two bevel gears on the said horizontal shaft, one near each opposite end, each of said two bevel gears having teeth on its outer surface which are in mesh with teeth of a separate corresponding bevel gear, each of the two corresponding bevel gears is rotatably held on the lower end of a vertical shaft, each of the two substantially vertical shafts extend upwards from their bevel gears through a separate hollow supporting member, each of the two hollow supporting members are attached to the main wing at similar positions on opposite sides of the fuselage; a hub attached to each upper section of each of the two substantially vertical shafts rotates with its shaft, each of the two hubs has corresponding ends of a number of lateral spokes attached to it in corresponding positions so that each of said spokes can oscillate, the other end of each lateral spoke is inserted through a corresponding end of separate corresponding blade, one end of a separate arm is fastened to each spoke, the upper end of a separate vertical arm control is pivotally attached to the other end of each separate arm, a separate plate is rotatable around each of said hollow supporting members by the lower end of adjacent arm extensions and attached to said plate, each plate is connected to a corresponding pipe casting rotatably attached to its adjacent supporting member as its axis, each pipe casting has two sprockets on its outer surface; lever controls operated from the cock-pit are attached to each pipe casting to raise or lower it on its supporting member; a supporting bar is attached at its center to each hub and rotates with its hub, two hollow upright supports are attached at corresponding positions, one on each opposite side of a supporting bar, a separate shaft extends through each hollow supporting member, and adjacent supporting bar; a separate sprocket is attached on the lower end of each of said shafts, a separate endless chain extends around the teeth of each of said sprockets and the teeth of its nearest sprocket on its nearest casting; one or more wings hinged to each upper end of said shafts, and means for holding each of said wings pointing in one direction during the rotation of its shaft by power from the engine through various connections, and said means attached to controls operated from the cock-pit.

3. In a combination airplane and helicopter, a fuselage, a cock-pit in the fuselage, a laterally extending main wing extending on each side of the fuselage, rudders connected to the fuselage and movable by controls in the cock-pit; an engine in the fuselage, means releasably attached to the said engine and a substantially horizontal shaft for rotating said shaft within its housing support, means for fastening the said housing support to the combination airplane and helicopter, a bevel gear cog on the outer end of the said shaft, said bevel gear cog having its teeth in mesh with the teeth of a second bevel gar cog on a substantially horizontal shaft, said horizontal shaft extends across the cock-pit and within the main wing on both sides of the cock-pit, two horizontal shaft supports attached to said main wing; said horizontal shaft having each opposite end extending through the center bore of a separate similar bevel cog, each of said two bevel cogs having teeth on its outer surface in mesh with teeth of a separate corresponding bevel cog, attached on and extending downward on a separate corresponding shaft, each of the two said shafts supported by separate hollow supporting members attached to the main wing at similar positions on opposite sides of the fuselage; a separate rotor attached in corresponding positions to the upper part of each of the said shafts and horizontally rotatable on its respective shaft as an axis, corresponding blades on each rotor, all of said blades on each rotor attached to means operated from the cock-pit for changing their angle of air resistance during rotation of their respective rotors; a separate casting rotatable around one of said hollow supporting member as its axis, a similar casting rotatable around the other hollow supporting member as its axis, two similar sprockets spaced apart attached to the outer surface of each casting; two hollow upright pipe supports attached to each rotor at corresponding positions one on each corresponding opposite side, said upright pipe supports extending through said rotors, a separate shaft extends through each of the two upright pipe supports; a separate sprocket attached on the lower end of each of said shafts rotates horizontally with its respective shaft, a separate endless chain extends around the teeth of each of said sprockets and the teeth of its nearest sprocket on the nearest said casting; one or more wings hinged to each upper end of each shaft, each wing having one end rounded, means for holding each set of wings pointing in one direction during the rotation with its respective rotor; means connected to the engine for rotating said rotors in opposite directions, and means attached to controls operated from the cock-pit for selectively changing the direction each of said wings must point during rotation with respective rotor, substantially as set forth.

4. In an airplane or helicopter, a fuselage, a wing attached to the fuselage and extending horizontally on two opposite sides of the fuselage, a tail rudder on the rear end of the fuselage, a tail rudder control operated from the fuselage; a separate upright pipe shaped support attached to each wing on opposite sides of the fuselage in similar positions by having each of said pipe shaped supports extend through the wing and braced to the wing, a separate shaft extending through each pipe shaped support and wing, a separate horizontally positioned rotor attached by bolts or otherwise to each upper end of each of the two shafts so that each rotor can revolve with its shaft as an axis, means attached to an engine located and operated from the fuselage for rotating each shaft and its rotor in opposite directions; horizontally positioned fan blades each rotatable on its long axis attached to each rotor, means for rotating said fan blades to any angle on its long axis, means for holding all fan blades in both rotors at any desired angle to resist the wing during rotation of both rotors; two upright hollow supports correspondingly located extend vertically through and are attached to a rotor in any convenient manner, a vertical shaft extends vertically through each upright support and rotor; two corresponding positioned hollow supports and shafts are attached to the second rotor in like manner; two flat wings of any desired shape, each have one side of a separate hinge fastened to its upper center hang vertically downward on the same side of one shaft one directly above the other by having the opposite side of their respective hinges attached in any convenient manner at correct height to one of the said shafts; each of the other three said shafts each have two similar wings similarly connected to each of said shafts, each of the two said shafts on each of the two said rotors have lower ends extending vertically through the center flat side of a separate similar sprocket, and means attached to each of said sprockets on one rotor for controlling the revolving of said sprocket on its shaft axis during the rotation of its corresponding rotor around its rotor shaft; and similar means attached to the sprockets on the other rotor for controlling the revolving of said sprocket on its shaft axis during the rotation of its corresponding rotor around its rotor shaft.

5. In a combination airplane and helicopter, a fuselage a main wing attached to the fuselage, steering controls attached to the fuselage and an engine attached within the fuselage; two pipe shaped supports attached to the main wing so that each pipe shaped support extends through a corresponding upper section of the main wing on opposite sides of the fuselage, a separate shaft extending through the entire bore of each of said pipe shaped supports and each shaft rotatably attached to its said pipe shaped support, the upper end of each of said shafts extending through and attached to the hub bore of a separate horizontally disposed rotor, each rotor having having blades attached to it, means attached to each of said blades for changing the angle of air resistance during the rotation of each rotor with its shaft as its axis, and one or more vertically disposed wings above each rotor and attached to its rotor, and means releasably connected to the said engine and rotors for revolving each of said rotors in an opposite direction on its shaft axis.

6. In an airplane or aircraft, a fuselage, a main wing attached to the fuselage, two horizontal rotors attached to the said main wings, vertical lifting blades attached to each of the two said rotors, wings for horizontal flying attached to each of said two rotors, means connected to each of said wings for horizontal flying and main wing for holding its adjacent wing for horizontal flying in either a horizontal or vertical direction; an engine disposed in the said fuselage and means attachable to the engine for rotating each of the two horizontal rotors in an opposite direction, substantially as set forth.

7. In a biplane, a fuselage, two main wings one above the other attached to the said fuselage, two horizontal rotors, each of said horizontal rotors attached by a substantially vertical axle to each of the said main wings so it may be rotated in either direction by its axle between the said main wings, two separate substantially vertical shafts each extending vertically through a hole near the outer circumference of each of said rotors, means for holding each of said substantially vertical shafts so either may rotate on bearings when held as set forth, wings hinged to the upper end of each of said shafts, and means for rotating each rotor on its own axle.

8. In a biplane, a fuselage, main wings attached to the fuselage and extending outward on each side of the said fuselage, two hollow supports attached to the main wings, a separate rotatable shaft rotatably attached within the bore of each of said hollow supports; an engine fastened to the fuselage, means connected to the engine and said two shafts for rotating each of said two shafts in opposite directions; a separate horizontally positioned hub attached to the upper end of each of said two upright shafts and each of said hubs rotatable by its adjacent shaft, one or more blades attached to each hub so it or they can oscillate; a separate wing supporting member attached near its center to each of said hubs, two upright wing supporting shafts attached to each of said wings supporting member so each can be rotated on its long axis, means attached to each of said wing supporting shafts and a control in the cock-pit for controlling the rotation of each of any of said wing supporting shafts around its own axis, and wings attached to each wing supporting shaft directly or indirectly by means of one or more hinges, substantially as set forth.

9. In a biplane, a fuselage, main wings attached to the fuselage and extending outward on each side of the said fuselage, two hollow supports attached to the main wings, a separate rotatable shaft, rotatably attached within the bore of each of said hollow supports; an engine fastened to the fuselage, means connected to the engine and said two shafts for rotating each of said two shafts in opposite directions; a separate horizontally positioned hub attached to the upper end of each of said two upright shafts and each of said hubs rotatable by its adjacent shaft, one or more blades attached to each hub so it can oscillate; a separate wing supporting member attached near its center to each of said hubs, two upright wing supporting shafts attached to each wing supporting member so it can be rotated on its long axis, means attached to each of said wing supporting shafts and a control in the cock-pit for controlling the rotation of each of any of said wing supporting shafts around its own axis, and wings attached to each wing supporting shaft directly or indirectly by means of one or more hinges, a shock absorber on each wing; a chain sprocket attached to each of said wing supporting shafts, an endless chain around each of said sprockets and a corresponding sprocket on a pipe shaped member, said pipe having its inside bore extend around an adjacent said hollow support so that said pipe shaped member is movable up or down on its said hollow support and releasably attached to its said hollow support so it cannnot rotate around its said position or it may be rotated; means releasably connected to said pipe shaped member for controlling its rotation when in a definite position in respect to its hollow support, substantially as set forth.

10. In a combination airplane and helicopter, wings attached to the fuselage, two horizontal wheels rotatably attached to said wings, horizontally extending fan blades attached to each wheel so that said fan blades can be rotated on their own axis by means attached to said fan blades and operated from the cock-pit; upright supporting members attached to each wheel so as to be rotatable around their own long axis, means attached to each upright supporting member for controlling its rotation on its own axis during the rotation of the wheel to which each is attached; one or more wings attached to each upright supporting member, means for rotating each of said two wheels in an opposite direction, and means for holding the angle of each blade on each wheel, and means for controlling the direction each wing faces, so that the said combination airplane and helicopter can hover over one position at a desired elevation when wind is blowing from any direction.

11. In an airplane or aircraft, a fuselage, wings attached to the said fuselage, a hollow pipe support attached to each wing, a separate shaft rotatably held by each of said hollow pipes, means attached to each separate shaft for rotating it around its long axis, a separate disk attached to each shaft near its upper end, fan blades attached to each separate disk, means for changing or holding each fan blade at any angle in respect to its disk during the rotation of its disk by its said shaft, means attached to each shaft for rotating said shaft and its adjacent disk; vertical positioned pipes attached to each disk, a shaft rotatably attached within each pipe, each shaft extending above and below its supporting pipe, a wing attached to the upper end of each of said shafts so said wing can be raised to a vertical position or lowered to a horizontal position, means attached to each wing and adjacent shaft for raising and lowering its wing to a horizontal or vertical position, a silent shock absorber attached to each wing, and means directing or holding each wing so that its opposite top ends point in any desired direction when said wing is rotated by its adjacent revolving disk; means for releasing each wing so that its turning will be controlled by centrifugal force during its rotation by its adjacent disk, substantially as set forth.

12. In an airplane or the like, a fuselage, a hollow upright support attached to said fuselage, a shaft extending through the inside hollow section of the said upright support, a wheel rotatably attached to the upper section of said shaft, a hollow pipe shaft fitted over the said hollow upright support and rotatable entirely around said hollow upright support as its axis, a wheel attached to said hollow upright shaft so it can to be rotated with its said hollow shaft under the first said wheel, a single hollow casting having four sprockets around its outer surface, said hollow casting attached to the said hollow upright support by having its inside bore fitting over the outer surface of the said hollow upright support so that one of said wheels is above said hollow casting and the other said wheel below said hollow casting, a key attaching said hollow casting to its hollow upright support so said casting cannot be rotated; fan blades selectively positioned and attached to each of said two wheels, two vertical holes near the outer rim selectively positioned and extending through each of said two wheels, two separate hollow supports extending vertically upward through separate said holes in the upper positioned wheel and selectively attached to said wheel; two similar hollow supports each extending downward through a separate said hole in the lower positioned wheel and each likewise selectively attached to its said wheel; a separate shaft rotatably attached to and extending upward through each upper hollow support; a separate shaft rotatably attached to and extending downward through each of the lower hollow supports; a separate wing selectively attached to and held to each upper shaft so each wing can hang vertically down or horizontally out from each support; a separate wing selectively attached to each downward extending shaft so each of said wings can extend downward vertically or extend outward horizontally from its adjacent shaft; a separate sprocket attached to each of the four said shafts as its respective axis, a separate endless chain extending around each of said sprockets and its nearest adjacent sprocket on the said casting, and means attached to the said shafts of each of the said two wheels for rotating each wheel in an opposite direction, a rudder attached to the said fuselage, and ailerons attached to extensions from said fuselage.

13. In a seaplane or airplane, a body, wings attached to the body, an upright support attached to the body, a shaft extending through said upright support and supported by said upright support, a hub attached over the upper end of said shaft as its axle and rotatable by its said shaft axle; a pipe shaft having its inside bore extend around the outer surface of the said upright support, a hub attached on the said pipe shaft as its axle and rotatable with its said pipe shaft axle, said second hub positioned to rotate below said first hub; a pipe shaped casting having four sprockets around its outer surface releasably attached to the said upright support between the upper and lower said positioned hubs; laterally extending blades attached to each of said hubs. a separate laterally extending support bar attached near its center to each hub and rotatable with its adjacent hub; two separate shaft supporting pipes extending upwards and selectively attached to the upper support bar near each opposite ends, two separate shafts supporting pipes extending downward and selectively attached to the lower support bar one at each opposite end; a separate shaft extends through the inside bore of each of said upright supporting pipes; one of said shafts extends through the inside bore of each of the downward shaft supporting pipes; wings attached by hinges to each downward extending shaft; a chain sprocket on each upward extending shaft; a chain sprocket on each downward extending shaft; a separate endless chain over each sprocket on the downward extending shaft and its nearest said pipe shaped casting sprocket; and means attached to one hub axis for rotating it in an opposite direction from the rotation of the other hub axis.

14. In a seaplane, a body, a shaft extending upward and attached to the said body so it may rotate. a horizontally positioned rotor member attached to the upper end of said shaft, a hollow supporting brace extending over said shaft and attached to said body, a hollow shaft having its inside bore over said supporting brace, a corresponding rotor positioned on said hollow shaft under said upper rotor; two corresponding wing shafts selectively attached to each rotor, means connected to each wing shaft for holding said wing shafts facing in any direction in reference to the said body during rotation by its nearest rotor, means attached to said upper rotor shaft for rotating it in one direction, and means connected to the second said rotor shaft for rotating it in the opposite direction, one or more wings attached to each wing shaft by a hinge or other similarly acting device, and positive means of bringing each wing to more or less vertical position from a more or less horizontal position once during each revolution of said wing around the circular course taken by its nearest rotor.

15. In a combination airplane and helicopter, a fuselage, a cock-pit in the fuselage, a tail rudder attached to said fuselage, an elevation control located near said tail rudder and attached to said fuselage, a main wing extending across the upper side of said fuselage and attached to said fuselage; an upright hollow support fastened at its base to the main wing at one side of the fuselage, a second like upright hollow support attached to the main wing on the other side of the fuselage in a corresponding position; a shaft extending through the long inside bore of the first said upright hollow support, a second corresponding shaft likewise extending through the long inside bore of the second said upright hollow support, bevel gear cog attached to the lower end of the first said shaft as its axis by a setscrew, a second like bevel gear cog attached to the lower end of the second said shaft in like manner; a pipe shaped member having upper inwardly extending teeth, also one lower outwardly extending tooth, and also two sprockets having teeth spaced around its outer surface, said pipe shaped member fitted over the top of the first said hollow support so that the upper inwardly extending teeth of said pipe shaped member mesh with corresponding teeth extending outwardly from the first said upright hollow support when said pipe shaped member is in its raised position; a second similar pipe shaped member is likewise positioned in like manner over the second said like hollow support so that the upper inner teeth of the said pipe shaped member are likewise in mesh with the outer teeth of its adjacent hollow support when the said second pipe shaped member is in its raised position; an index sprocket having its inner bore of a size to fit over the base end of the first upright hollow support extends around said upright hollow support as its axle, said index sprocket having a gap in its inner bore approximately equal to the said single tooth on the pipe shaped member; a second similar index sprocket likewise fits over the lower end of the second upright hollow support; a corresponding rotor member is attached on the upper end of each of said two shafts; means attached to each of said bevel gear cogs for rotating each bevel gear cog in an opposite direction, two wing shafts attached to each rotor, wings attached to each upper side of each wing shaft above its adjacent rotor, a sprocket attached to the lower end of each wing shaft, and a separate endless chain over a sprocket on a wing shaft and its nearest sprocket on said pipe shaped member, a similar chain connected between each sprocket on each other wing shaft and its nearest sprocket on its nearest pipe shaped member; means for raising or lowering each pipe shaped member on its upright hollow support, and means for rotating each of said index sprockets when its nearest pipe shaped member is lowered just below the adjacent teeth of its adjacent upright support but still at a height where the single tooth of the nearest pipe shaped member is positioned within the gap of an index sprocket, substantially as set forth.

16. In a combination airplane and helicopter, a fuselage a main wing attached to the fuselage, steering controls attached to the fuselage and an engine attached within the fuselage; two pipe shaped supports attached to the main wing so that each pipe shaped support extends through a corresponding upper section of the main wing on opposite sides of the fuselage, a separate shaft extending through the entire bore of each of said pipe shaped supports, the upper end of each of said shafts extending through and attached to the hub bore of a separate horizontally disposed rotor, each rotor having blades attached to it, means attached to each of said blades for changing the angle of air resistance during the rotation of each rotor with its shaft as its axis, and one or more vertically disposed wings above each rotor and attached to its rotor, and means releasably connected to the said engine and rotors for revolving each of said rotors in an opposite direction on its shaft axis, and means for controlling the position with reference to its fuselage that each revolving wing must face during its revolution by its nearest rotor.

17. In a combination airplane and helicopter, a fuselage a main wing attached to the fuselage, steering controls attached to the fuselage and an engine attached within the fuselage; two pipe shaped supports attached to the main wing so that each pipe shaped support extends through a corresponding upper section of the main wing on opposite sides of the fuselage, a separate shaft extending through the entire bore of each of said pipe shaped supports and each shaft rotatably attached to its said pipe shaped support, the upper end of each of said shafts extending through and attached to the hub bore of a separate horizontally disposed rotor, each rotor having blades attached to it, means attached to each of said blades for changing the angle of air resistance during the rotation of each rotor with its shaft as its axis, and one or more vertically disposed wings above each rotor and attached to its rotor, and means releasably connected to the said engine and rotors for revolving each of said rotors in an opposite direction on its shaft axis, and means for controlling the position with reference to its fuselage that each revolving wing must face during its revolution by above it nearest rotor, and means for changing the angle of any wing in reference to its fuselage during the rotation of any of said wings.

18. In an airplane, a body, wheels and means of attaching said wheels to the underside of said body, a motor within the said body and attached to said body, a vertical hollow supporting member having its lower end attached to said body, a shaft extending through the hollow section of said supporting member so that its upper and lower ends extend beyond said vertical hollow supporting member, a cog attached to the lower end section of said shaft below the said hollow supporting member, a hub attached to the upper section of said shaft adjacent to where said shaft extends through the bore of said hub, a wing shaft support bolted or otherwise attached to one side of said hub, a second wing shaft support likewise bolted or otherwise attached to the other side of said hub, a vertical hole through the outer end section of the first said wing shaft support when attached to the hub, a second similar vertical hole through the outer end section of the second wing shaft support when attached to the said hub; a hollow upright wing shaft support having its lower end entered through the first said hole in the first said wing shaft support and attached to said support by a flange or otherwise a second similar hollow upright wing shaft support having its lower end extend through the second said hole in the second said wing shaft support and attached to said support by a flange or otherwise; a shaft with a pulley attached to its lower end attached within the first said hollow shaft support, a like second shaft with a pulley attached to its lower end; a hollow pipe member rotatably attached over the said vertical hollow member having its lower end attached to said body and having an outward right angle extension on its upper end, two somewhat similar wing shaft supports each attached to said right angle extension in substantially the same manner as stated in regard to the said two wing shaft supports attached to said hub; a separate short hollow shaft support extending downward and attached by its upper end section to the outer end section of one of the said wing shaft supports in a similar manner as already stated in reference to the first mentioned upright shaft support fastened to its wing shaft support; a similar second short hollow shaft support on the other side of said right angle extension; a separate wing shaft extending downward through each of said short hollow shaft supports each of said shafts having a separate pulley attached on its upper section; a wing directly or indirectly hinged to each of said upper upright shafts; a separate wing hinged to each downward extending said shaft; a separate combination shock absorber and noise silencer attached to each of said wings; a double pulley attached to the said single vertical supporting member by having a section of said vertical supporting member extend through the inside bore of said pulley so that said pulley is held on the said section of said vertical supporting member below the said hub and above the said upper right angle extension; said lower section of said first mentioned shaft extending through the bore of a bevel gear cog and attached in any convenient manner to said gear cog so that its teeth face substantially upwards, a second bevel gear cog having its teeth face substantially downward is attached in any convenient manner over the lower end section of said first mentioned hollow member, and a bevel gear on the shaft of said motor positioned so that its upper teeth during its rotation are in mesh with similar teeth on its said bevel gear cog on the said hollow member, and the lower teeth of said bevel gear cog on said motor shaft has its teeth in mesh with similar teeth on said first mentioned shaft.

19. In a seaplane or airplane, a body, wings attached to the body, an upright support attached to the body, a shaft extending through said upright support and supported by said upright support, a hub attached over the upper end of said shaft as its axle and rotatable by its said shaft axle; a pipe shaft having its inside bore extend around the outer surface of the said upright support, a hub attached on the said pipe shaft as its axle and rotatable with its said pipe shaft axle, said second hub positioned to rotate below said first hub; a pipe shaped casting having four sprockets around its outer surface attached to the said upright support between the upper and lower said positioned hubs; a separate laterally extending support bar attached near its center to each hub and rotatable with its adjacent hub. Two separate shaft supporting pipes extending upwards and selectively attached to the upper support bar near each opposite ends, two separate shafts supporting pipes extending downward and selectively attached to the lower support bar one at each opposite end; a separate shaft extends through the inside bore of each of said upright supporting pipes; one of said shafts extends through the inside bore of each of the downward shaft supporting pipes; wings curved on one side attached by hinges to each downward extending shaft; a chain sprocket on each upward extending shaft; a chain sprocket on each downward extending shaft; a separate endless chain over each sprocket on each downward extending shaft and its nearest said pipe shaped casting sprocket; and means attached to one hub axis for rotating it in an opposite direction from the rotation of the other hub axis; and a spring shock absorber on each shaft with a noise eliminator attached to the outer end of said each shock absorber at a location where a downward swinging wing comes in contact with said shock absorber and a separate spring tensioning between any wing in its horizontal position and its adjacent shaft support.

20. In a combination airplane and helicopter, a fuselage, a cock-pit in the fuselage, a tail rudder attached to said fuselage, an elevation control located near said tail rudder and attached to said fuselage, a main wing extending across the upper side of said fuselage and attached to said fuselage; the upright hollow support fastened at its base to the main wing at one side of the fuselage, a second like upright hollow support attached to the main wing on the other side of the fuselage in a corresponding position; a shaft extending through the long inside bore of the first said upright hollow support, a second corresponding shaft likewise extending through the long inside bore of the second said upright hollow support, bevel gear cog attached to the lower end of the first said shaft as its axis by a setscrew, a second like bevel gear cog attached to the lower end of the second said shaft in like manner; a pipe shaped member having upper inwardly extending teeth, also one lower outwardly extending tooth, and also two sprockets having teeth spaced around its outer surface, said pipe shaped member fitted over the top of the first said hollow support so that the upper inwardly extending teeth of said pipe shaped member mesh with corresponding teeth extending outwardly from the first said upright hollow support when said pipe shaped member is in its raised position; a second similar pipe shaped member is likewise positioned in like manner over the second said like hollow support so that the upper inner teeth of the said pipe shaped member are likewise in mesh with the outer teeth of its adjacent hollow support when the said second pipe shaped member is in its raised position; an index sprocket having its inner bore of a size to fit over the base end of the first upright hollow support extends around said upright hollow support as its axle, said index sprocket having a gap in its inner bore approximately equal to the said single tooth on the pipe shaped member; a second similar index sprocket likewise fits over the lower end of the second upright hollow support; a corresponding rotory member is attached on the upper end of each of said two shafts; means attached to each of said bevel gear cogs for rotating each bevel gear cog in an opposite direction, two wing shafts attached to each rotor, wings attached to each upper side of each wing shaft above its adjacent rotor, a sprocket attached to the lower end of each wing shaft, and a separate endless chain over a sprocket on a wing shaft and its nearest sprocket on said pipe shaped member, a similar chain connected between each sprocket on each wing shaft and its nearest sprocket on its nearest pipe shaped member; and means for rotating each of said index sprockets when its nearest pipe shaped member is lowered just below the adjacent teeth of its adjacent upright support but still at a height where the single tooth of the nearest pipe shaped member is positioned within the gap of an index sprocket, substantially as set forth; means for rotating said two rotor members in an opposite direction; a clutch connected to levers and controls for raising or lowering each of said two pipe shaped members at the same time by means of a separate wheel positioned between an upper and lower section of its adjacent pipe shaped member, said clutch in its upward position having connections which operate to fly the combination airplane and helicopter in a more or less horizontal direction; said clutch in its middle position has connections which operate to both raise the airplane vertically or hold the airplane in its present elevation and (depending on the speed of rotation of its rotors) and at the same time fly the said combination airplane and helicopter in a somewhat horizontal direction; said clutch in its lowest position has connections which operate to fly the combination airplane and helicopter in a more or less vertical position; and means for steering the said combination airplane by changing the angle of any rotating wing in respect to the said fuselage, substantially as set forth.

WILLIAM HUNTINGTON RUSSELL.